United States Patent Office 3,411,611
Patented Nov. 19, 1968

3,411,611
STARTER CLUTCH WITH SLIP COUPLING
Robert J. Powell, deceased, late of Muskegon, Mich., by Ruth B. Powell, administratrix, Muskegon, Mich., assignor to Continental Motors Corporation, Muskegon, Mich., a corporation of Virginia
Filed Nov. 3, 1966, Ser. No. 591,929
5 Claims. (Cl. 192—42)

ABSTRACT OF THE DISCLOSURE

A friction clutch assembly for connecting an engine to a starter motor including a male friction member having a frusto-conical outer surface and mounted to the crankshaft of the engine. A female friction member is provided with a frusto-conical inner surface and is movable into engagement with the male friction member upon operation of the starting motor to thereby drive the engine. When engine speed exceeds the speed of the starter motor the friction members separate to disconnect the starting motor from thet engine. The connection between the starting motor and the female friction member includes frictional means to permit relative rotation between these members in the event of excessive torque being produced by reason of engine backfire.

Figure 1:
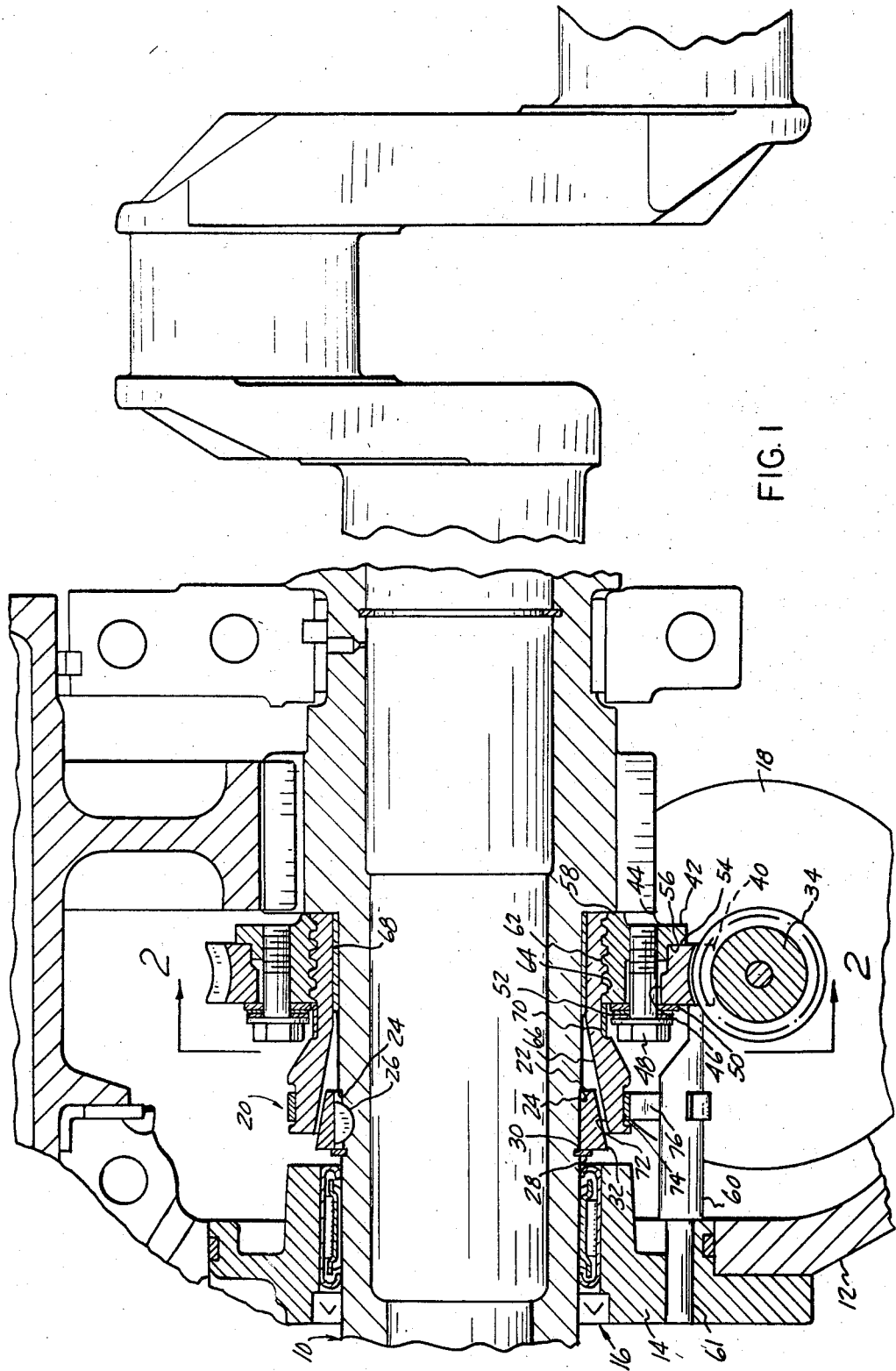

This invention relates to clutch assemblies and more particularly to a friction clutch assembly having a pair of meshing helical gears providing engagement and disengagement of the friction elements of the clutch to couple and uncouple a starting motor to and from an internal combustion engine.

Conventional starting motor engaging mechanism utilizes an over-running clutch arrangement which comprises a pinion gear of relatively large mass mounted on a worm type screw machined on an extension of the armature shaft of the cranking or starting motor. The mass or inertia of the pinion is designed to be sufficiently large so that upon initial rotation of the worm screw, the inertia force of the pinion will exceed the frictional force between the pinion and the worm screw. As the worm screw turns the pinion advances along the axis of the screw to engage the fly wheel ring gear of the engine being started. A stop is normally provided to limit the axial travel of the pinion and thereby locks the gear in engagement so that the cranking motor is operative to turn the fly wheel ring gear. At the end of the cranking cycle or when the engine has fired to reach a self-sustaining rotational condition, the pinion gear is returned along the worm screw due to the over-speeding of the pinion by the fly wheel ring gear.

In high powered engine starters, it is necessary that once the engine has begun to fire the starting motor be disengaged from an operative connection with the fly wheel ring gear of the engine. If their disengagement is delayed, severe shock is transmitted to the jaws and gearing of the clutch arrangement.

It is the broad purpose of the present invention to provide an improved friction clutch arrangement to prevent injury or damage to the motor and which has little tendency to lock in engagement once the engine has started and which furthermore is constructed to absorb a counter-torque to the torque of the starting motor actuated by a back fire of the engine.

The preferred embodiment of the present invention which will be subsequently described in detail comprises a pair of members having mating frusto-conical friction surfaces, one of which is fixed to a driven member such as the crankshaft of the engine and the other which is axailly slidably movable toward and away from an engaging position with the fixed friction member. The movable friction member is provided with a male helical gear which is at all times in mesh with a female helical gear and is fixed against axial movement. Rotation of the female helical gear produces axial movement of the male helical gear thus moving the friction members toward or away from an engaging position. A worm and wheel gear arrangement is operatively connected to the output of the starting motor and provides a suitable speed reduction means. The wheel gear is attached to an annular flange carried by the female helical gear through frictional retaining means which permits relative rotation between the worm wheel and the helical gear in the event of an excessive torque being applied to the system.

Rotation of the starting motor is transmitted through the helical gear arrangement to move the conical frictional members into engagement to thereby rotate the engine crankshaft. When the engine has fired such that it maintains a self-sustaining rotation, the conical frictional member carried by the crankshaft delivers a torque from the engine to the movable conical section sufficient to cause it to disengage. The axial separation of the friction members is permitted by the meshing helical gears.

The helical gear arrangement thus provides an automatic means for disengaging the friction members of the clutch responsive to the torque developed by the engine having achieved a self-sustaining firing rate. By providing a frictional overload means, the improved clutch assembly provides a safety mechanism to prevent damage to the starting motor in the event that excessive torques are imposed on the clutch assembly.

It is therefore an object of the present invention to provide a novel clutch assembly for operatively connecting an engine starter to an engine having a pair of companion friction members supported for rotational movement and one of which is axially movable between an engaged position and a disengaged position, the axial displacement of the movable friction member being provided by a pair of meshing helical gears permitting engagement of the friction members in response to a torque developed by the starter and disengagement in response to a torque developed by the engine.

It is another object of the present invention to provide an overload mechanism in a clutch assembly adapted for coupling a starting motor to an engine and which comprises a pair of torque transmitting members supported for rotation including a first member adapted for a driven connection to the engine and a second member adapted for driving connection to the starting motor, one of said members having a series of slots to accommodate fasteners for engaging the first member to the second member, the fasteners engaged with a torque of a predetermined magnitude to permit the first and second members to slip relative to one another upon the application of an excessive torque in the driveline assembly.

Figure 2:
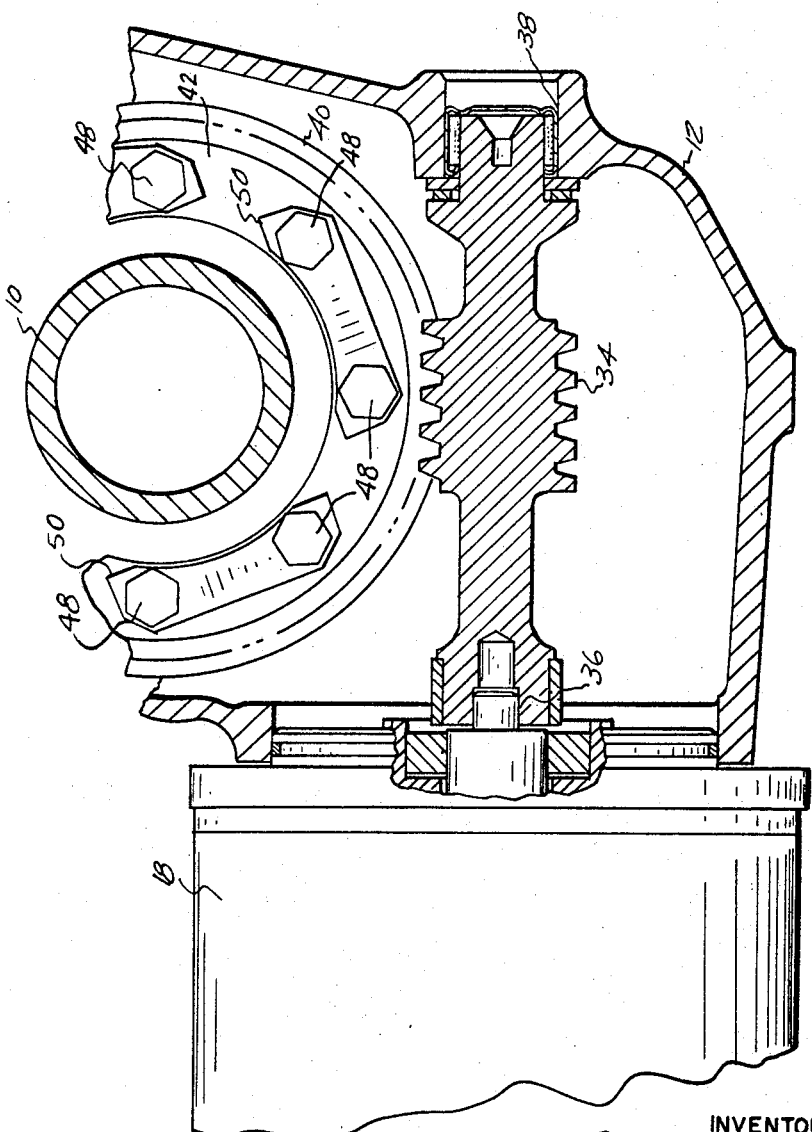

Still further objects and advantages of the present invention will readily occur to one skilled in the art to which the invention pertains upon reference to the following detailed description. The description makes reference to the accompanying drawings in which like reference characters refer to like parts throughout the several views and in which:

FIGURE 1 is a longitudinal cross-sectional view of a portion of an engine and a starter assembly illustrating a preferred embodiment of the present invention; and FIGURE 2 is a sectional view taken along lines 2—2 of FIGURE 1.

Description

Now referring to the drawings an engine of the internal combustion engine type is illustrated as having a hollow crankshaft 10, a crankcase 12 and a cover plate 14 supported thereby and provided with a seal assembly 16 in engagement with the crankshaft 10. A conventional starting motor 18 is connected to the crankshaft 10 through a friction clutch assembly generally indicated at 20. Normal start-up operation of the engine includes energizing the motor 18. The torque developed by the motor 18 causes clutch assembly 20 to mechanically couple the motor 18 to the crankshaft 10 to produce rotation thereof until the engine fires at a self-sustaining rate. The friction clutch assembly 20 is responsive to the torque applied by the engine to the crankshaft 10 and is operative to disengage the starting motor 18 from the crankshaft 10.

The operative elements of the friction clutch assembly 20 comprise an annular male friction member 22 which is seated against a shoulder 24 defining a reduced section of the crankshaft 10 which is provided with a slot which engages a woodruff key 26. The key 26 prevents rotation of the member 22 relative to the crankshaft 10. A retaining ring 28 is seated in a circumferential recess 30 axially spaced from shoulder 24 arranged to prevent axial displacement of the member 22 relative to the crankshaft.

The male friction member 22 is provided with a frustoconical friction surface 32 and is preferably split to improve its gripping characteristics.

Now as can best be seen in FIGURE 2, a worm gear 34 is supported on an axial extension of the armature shaft 36 of the starting motor 18 and is rotatably carried thereby. The outer free end of the worm gear 34 is journaled for rotation in a bearing 38 formed in the crankcase 12.

The worm gear 34 is at all times meshed with a worm wheel 40. The worm wheel 40 is supported by a nut 42 having an annular flange 44. The wheel 40 is provided with a series of annularly spaced slots 46 each of which receives a bolt 48. The inner end of each of the bolts 48 threadably engage the flange 44 of the nut 42. A clutch member 50 is retained between the head of each bolt 48 and its associated slot 46. A belleville washer 52 provides a bearing surface between the head of each of the bolts 48 and the clutch members 50. A torque is applied to each of the bolts 48 of a predetermined magnitude so that an annular shoulder 54 of the worm wheel bears against a seat 56 provided in the flange 44 of the nut 42.

The extreme end 58 of the nut 42 abuts an enlarged portion of the crankshaft 10 so that axial displacement of the nut 42 away from the male friction member 22 is prevented. A pin 60 having a narrowed section 61 journaled in the cover 14 has a free end which abuts the worm wheel 40 so as to maintain the worm wheel substantially in alignment with the worm gear 34.

The annular nut 42 is provided with a female helical threaded portion 62 which is at all times in mesh with a male helical threaded portion 64 formed on the end of a female conical member 66. The female conical member 66 is supported for axial slidable movement on the crankshaft 10 by a bearing 68.

It is to be understood that the female helical conical member 66 is movable toward and away from the male conical member 22 and is provided with a retainer member 70 which abuts the nut 42 to define an extreme spaced position relative to the male conical member 22. The conical member 66 is provided with a female conical friction surface 72 which has a taper corresponding to the friction surface 32 of the male conical member 22. Engagement of the friction surfaces 72 and 32 provides a torque transfer connection between the starting motor 18 and the crankshaft 10.

The female conical member 66 is provided with an annular recess 74 which provides a seat for a spring 76 which functions to bias the female conical member 66 and the male conical member 22 into a frictional engagement. The spring 76 is anchored to the pin 60 as can best be seen in FIGURE 1.

In operation, the starting motor 18 is energized through a source of electrical energy (not shown) to produce a rotation of the worm gear 34 which in turn produces rotation of the nut 42 by means of the worm wheel 40. The worm wheel 40 and the worm gear 34 cooperate in reducing the rotational output of the starting motor to a rate generally corresponding to the idling rotation of the shaft 10 and also accommodates the non-parallel relationship of the axes of the worm gear 34 and the crankshaft 10.

Rotation of the nut 42 produces an axial displacement of the conical female member 66 through the helical threaded portions 62 and 64. As the conical member 66 moves axially toward the conical member 22, the frustoconical frictional surfaces 32 and 72 come into engagement so that a torque transmitting relationship is established between the motor 18 and the crankshaft 10. When the engine has started such that it produces a torque on the crankshaft 10 sufficient to exceed the torque provided by the motor 18 on the conical member 66, the frictional surface 32 causes the frictional surface 72 to disengage from the surface 32 and produces a movement of the conical member 66 away from the conical member 22. The helical threaded portions 62 and 64 thereby permit the conical member 66 to move axially away from the conical member 22. The starting motor 18 is then normally de-energized.

In the event of excessive torque being applied to the clutch assembly such as might be caused by an engine backfire which produces a counter-torque in opposition to the normal torque of the starting motor 18, the bolts 48 the clutch members 50 and belleville washers 52 provide a safety means permitting relative rotational movement between the nut 42 and the worm wheel 40. This relative movement or slippage thus prevents damage to the various torque transmitting parts of the assembly and the starting motor 18.

Although there has been described but one preferred embodiment of the inventon, it is to be understood that various revisions and modifications can be made and without departing from the spirit of the invention as expressed in the scope of the appended claims.

What is claimed is:

1. A friction clutch assembly in a torque delivery drive line comprising:
   (a) a rotatable driving member connected to a source of torque,
   (b) a rotatable driven member,
   (c) a pair of friction members each having a friction surface and relatively movable toward and away from one another between a first position wherein said driven member is fully coupled in torque transfer relationship with said driving member and a second position wherein said driven member is uncoupled from said driving member,
   (d) means producing relative movement of said friction members toward the first position upon rotation of said driving member, said means comprising one of said friction members being supported to rotate about the axis of and axially movable with respect to said driven member, said last mentioned friction member having a helical threaded section, a member rotatable with respect to and about the axis of said driven member, said last mentioned member being fixed against axial movement and having a helical threaded section meshing with the threaded section of said last mentioned friction member, and means connecting said last mentioned member to produce rotation thereof with rotation of said driving member to produce axial movement of said last mentioned friction member toward the other friction member,
   (e) said last mentioned means comprising, a toothed wheel and means connecting said toothed wheel to said last mentioned member so that rotation of said toothed wheel produces rotation of said last mentioned member, a worm gear carried by said driving member and meshing with said toothed wheel, and (f) said last mentioned connecting means including means for frictionally securing said toothed wheel to said last mentioned member and effective to permit relative rotational movement therebetween when a counter-torque of a predetermined magnitude is applied to said driven member in opposition to the torque applied to said driving member.

2. A friction clutch assembly as defined in claim 1, wherein said driving member and said driven member are supported for rotation about a pair of non-intersecting, non-parallel axis.

3. A friction clutch assembly for connecting a first shaft to a second shaft, said assembly comprising,
  (a) a first and a second friction member carried by said first shaft with said first friction member fixed to said first shaft for rotation therewith and said second friction member rotatable about and axially movable with respect to said first shaft,
  (b) means drivingly connecting said second shaft to said second friction member and means producing axial movement of said second frictional member toward a position engaging said first frictional member upon rotation of said second shaft with respect to said first shaft, and
  (c) said connecting means comprising a nut member carried by said second friction member, a gear member intermediate said nut member and said second shaft and means frictionally connecting said gear member to said nut member and permitting relative rotational movement therebetween when a torque of a predetermined magnitude is imposed upon said second frictional member by said first shaft.

4. The assembly as defined in claim 3 and in which said friction members have male and female conical friction surfaces in engagement when said shafts are in driving engagement.

5. The assembly as defined in claim 3 and in which said frictional connecting means comprises:
  (a) a plurality of bolts mounting said gear member to said nut member, and
  (b) said bolts extending through elongated slots formed in said one of said members and frictional means disposed intermediate said bolt and said slotted member to ordinarily transmit rotation of said gear member to said nut member but to permit slippage when the countertorque imposed upon said nut member exceeds the torque of said gear member by a predetermined magnitude.

References Cited

UNITED STATES PATENTS

| 1,770,419 | 7/1930 | McGrath | 192—41 |
| 3,315,773 | 4/1967 | Aschauer. | |

FOREIGN PATENTS

| 181,710 | 6/1921 | Great Britain. |
| 612,668 | 5/1935 | Germany. |

BENJAMIN W. WYCHE III, *Primary Examiner.*